United States Patent
Ackermann et al.

(10) Patent No.: US 7,181,915 B2
(45) Date of Patent: Feb. 27, 2007

(54) HIGH TEMPERATURE CENTERBODY FOR TEMPERATURE REDUCTION BY OPTICAL REFLECTION AND PROCESS FOR MANUFACTURING

(75) Inventors: John Frederick Ackermann, Laramie, WY (US); Paul V. Arszman, Cincinnati, OH (US); Bangalore A. Nagaraj, West Chester, OH (US); Craig D. Young, Maineville, OH (US); Nicole Justis, San Diego, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/335,647

(22) Filed: Dec. 31, 2002

(65) Prior Publication Data

US 2004/0123599 A1  Jul. 1, 2004

(51) Int. Cl.
*F02K 1/78* (2006.01)
*B32B 15/04* (2006.01)

(52) U.S. Cl. ............................ 60/770; 428/472
(58) Field of Classification Search ............... 60/770; 428/472, 615, 622
See application file for complete search history.

(56) References Cited

U.S. PATENT DOCUMENTS

| | | |
|---|---|---|
| 3,775,977 A | 12/1973 | Builder et al. |
| 3,938,324 A | 2/1976 | Hammond, Jr. et al. |
| 4,110,972 A | 9/1978 | Young et al. |
| 4,802,629 A | 2/1989 | Klees |
| 5,125,227 A | 6/1992 | Ford et al. |
| 5,223,045 A | 6/1993 | Priceman et al. |
| 5,421,158 A | 6/1995 | Stenger et al. |

(Continued)

FOREIGN PATENT DOCUMENTS

EP  1069205  1/2001

(Continued)

*Primary Examiner*—Michael Koczo, Jr.
(74) *Attorney, Agent, or Firm*—McNees Wallace & Nurick LLC

(57) ABSTRACT

A high temperature gas turbine component for use in the gas flow path that also is a specular optical reflector. A thin layer of a high temperature reflector is applied to the gas flow path of the component, that is, the surface of the component that forms a boundary for hot combustion gases. The component typically includes a thermal barrier coating overlying the high temperature metallic component that permits the component to operate at elevated temperatures. The thermal barrier coating must be polished in order to provide a surface that can suitably reflect the radiation into the gas flow path. A thin layer of the high temperature reflector the is applied over the polished thermal barrier coating by a process that can adequately adhere the reflector to the polished surface without increasing the roughness of the surface. The high temperature reflector can be applied to any surface aft of the compressor, such as on a centerbody. The surface reflects radiation back into the hot gas flow path or into the atmosphere. The reflected radiation is not focused onto any other hardware component. The design of the component is such that the radiation is returned to the gas flow path or sent to the atmosphere rather than absorbed into a component wall that only serves to increase the temperature of the wall.

14 Claims, 2 Drawing Sheets

U.S. PATENT DOCUMENTS

| | | |
|---|---|---|
| 5,682,747 A | 11/1997 | Brown et al. |
| 5,791,562 A | 8/1998 | Kramer et al. |
| 5,851,679 A * | 12/1998 | Stowell et al. .............. 428/472 |
| 5,970,716 A | 10/1999 | Forrester et al. |
| 5,996,352 A | 12/1999 | Coughlan et al. |
| 6,092,359 A | 7/2000 | Ackermann et al. |
| 6,141,954 A | 11/2000 | Sowa et al. |
| 6,141,967 A | 11/2000 | Angel et al. |
| 6,176,087 B1 | 1/2001 | Snyder et al. |
| 6,207,295 B1 * | 3/2001 | Stowell et al. .............. 428/615 |
| 6,210,791 B1 | 4/2001 | Skoog et al. |
| 6,254,756 B1 | 7/2001 | Maricocchi et al. |
| 6,465,090 B1 | 10/2002 | Stowell et al. |
| 6,652,987 B2 * | 11/2003 | Allen et al. ................. 428/622 |

FOREIGN PATENT DOCUMENTS

| | | |
|---|---|---|
| EP | 1 076 116 A1 | 2/2001 |

* cited by examiner

HIGH TEMPERATURE CENTERBODY FOR TEMPERATURE REDUCTION BY OPTICAL REFLECTION AND PROCESS FOR MANUFACTURING

CROSS-REFERENCE TO RELATED APPLICATIONS

This Application is related to application Ser. No. 10/335,657, filed contemporaneously with this Application on Dec. 31, 2002, entitled "IMPROVED HIGH TEMPERATURE SPLASH PLATE FOR TEMPERATURE REDUCTION BY OPTICAL REFLECTION AND PROCESS FOR MANUFACTURING" assigned to the assignee of the present invention and which is incorporated herein by reference, to application Ser. No. 10/335,486, filed contemporaneously with this Application on Dec. 31, 2002, entitled "IMPROVED HIGH TEMPERATURE TURBINE NOZZLE FOR TEMPERATURE REDUCTION BY OPTICAL REFLECTION AND PROCESS FOR MANUFACTURING" assigned to the assignee of the present invention and which is incorporated herein by reference, and to application Ser. No. 10/335,442, filed contemporaneously with this Application on Dec. 31, 2002, entitled "IMPROVED HIGH TEMPERATURE COMBUSTOR WALL FOR TEMPERATURE REDUCTION BY OPTICAL REFLECTION AND PROCESS FOR MANUFACTURING" assigned to the assignee of the present invention and which is incorporated herein by reference.

FIELD OF THE INVENTION

The present invention is directed to gas turbine engines, and in particular, to modifications of components of such engines to reduce the temperature of boundary walls of the hot section portions of the components by optical radiation generated by combustion

BACKGROUND OF THE INVENTION

In the compressor portion of an aircraft gas turbine engine, atmospheric air is compressed to 10–25 times atmospheric pressure, and adiabatically heated to about 800°–1250° F. (425°–675° C.) in the process. This heated and compressed air is directed into a combustor, where it is mixed with fuel. The fuel is ignited, and the combustion process heats the gases to very high temperatures, in excess of 3000° F. (1650° C.). These hot gases pass through the turbine, where rotating turbine wheels extract energy to drive the fan and compressor of the engine, and the exhaust system, where the gases supply thrust to propel the aircraft, and along the centerbody. To improve the efficiency of operation of the aircraft engine, combustion temperatures have been raised. Of course, as the combustion temperature is raised, steps must be taken to prevent thermal degradation of the materials forming the flow path for these hot gases of combustion.

Every aircraft gas turbine engine has a so-called High Pressure Turbine (HPT) to drive its compressor. The HPT sits just behind the compressor in the engine layout and experiences the highest temperature and pressure levels (nominally 2400° F. and 300 psia respectively) developed in the engine. The HPT also operates at very high speeds (10,000 RPM for large turbofans, 50,000 for small helicopter engines). In order to meet life requirements at these levels of temperature and pressure, HPT's today are always aircooled and constructed from advanced alloys.

While a straight turbojet engine will usually have only one turbine (an HPT), most engines today are of the turbofan, either high bypass turbofan or low bypass turbofan, or turboprop type and require one (and sometimes two) additional turbine(s) to drive a fan or a gearbox. The additional turbines are called the Low Pressure Turbines (LPT) and immediately follows the HPT in the engine layout. Since substantial pressure drop occurs across the HPT, the LPT operates with a much less energetic fluid and will usually require several stages (usually up to six) to extract the power.

In high-bypass fan turbofan engines the primary exhaust nozzle assembly consists of a centerbody and an outer barrel fairing. The turbine nozzle directs the primary gas aft and regulates the gas stream flow. The centerbody is aerodynamically shaped and has an outer surface that is located within the flow path of the hot core gas that has passed through the LPT. The outer surfaces of the outer fixed cowl provides a continuation of the fan flowpath. The nozzle outer barrel assembly is comprised of an outer cowl bolted to the inner barrel position called the primary nozzle. There are ports on the inner barrel to introduce engine low pressure recoup into the primary airstream. In low-bypass fan turbofan engines, the centerbody is not part of the primary exhaust nozzle assembly, but rather is positioned directly aft of the LPT and fore of the augmenter.

One well-known solution that has been undertaken to protect the metals that form the flow path for the hot gases of combustion, including those of the HPT, LPT, and primary nozzle assembly have included application of protective layers having low thermal conductivity. These materials are applied as thermal barrier coating systems (TBCs), typically comprising a bond coat that improves adhesion of an overlying ceramic top coat, typically a stabilized zirconia, to the substrate. These systems are known to improve the thermal performance of the underlying metals that form the flow path in the hot section of the engine. However, as temperatures of combustion have increased, even these TBCs have been found to be insufficient. In particular, the centerbodies of high efficiency, advanced cycle turbine engines are prone to failure as a result of thermal degradation. While some modifications of the traditional flow path surfaces have been applied in the past, such as the application of materials over the TBC, these modifications have been directed to reducing the emissions of pollutants such as unburned hydrocarbons (UHC) and carbon monoxide (CO). One such modification is set forth in U.S. Pat. No. 5,355,668 to Weil, et al., assigned to the assignee of the present invention, which teaches the application of a catalyst such as platinum, nickel oxide, chromium oxide or cobalt oxide directly over the flow path surface of the thermal barrier coating of a turbine engine component. The catalyst layer is applied to selected portions of flow path surfaces to catalyze combustion of fuel. The catalytic material is chosen to reduce air pollutants such as unburned hydrocarbons (UHC) and carbon monoxide (CO) resulting from the combustion process. The catalytic layer is applied to a thickness of 0.001 to 0.010 inches and is somewhat rough and porous, having a surface roughness of about 100 to 250 micro inches, in order to enhance the surface area available to maximize contact with the hot gases in order to promote the catalytic reaction. The rough surface assists in creating some turbulence that promotes contact with the catalytic surface.

The prior art solutions are either directed to problems that are unrelated to the problem of high temperature degradation experienced by centerbodies, such as the Weil patent, or provide different solutions to the problem of high temperatures resulting from the combustion process. The present invention provides a different approach to the problem of high temperatures experienced by centerbodies.

SUMMARY OF THE INVENTION

The present invention is a high temperature gas turbine component for use in the hot gas flow path that also is a specular optical reflector. The gas turbine component is positioned in the hot section of the engine, behind the turbine section and reflects heat radiation, for example, infrared radiation, from the turbine region back into the hot core gas flow path or into the atmosphere. The reflected radiation is focused away from any other hardware component in the HPT, LPT or primary nozzle region so that the radiative heat passes out the nozzle and into the either the augmentor or the atmosphere, depending upon the type of engine. The design of the component is such that the radiation is returned to the gas flow path rather than absorbed into a component wall which only serves to increase the temperature of the wall.

A thin layer of a high temperature reflector metal is applied to the flow path surface of the component, that is, the surface of the component that forms a boundary for hot core gases in the vicinity of the centerbodies. Generally, combustion gases are present in the region of the gas turbine engine where the flame is produced and Combustion gas temperatures are generally greater than about 4000° F. (2200° C.). Core gases are combustion gases that have been mixed with cooling air or other air that does not flow from the combustion region. Hot core gases are generally in the region of about 1600° F. (870° C.) to about 2200° F. (1200° C.). The high temperature reflector must be applied as an optically smooth coating. The component typically includes a thermal barrier coating overlying the high temperature metallic component that permits the component to operate at elevated temperatures. The thermal barrier coating (TBC) applied to the component typically is rough and must be polished in order to provide a sufficiently smooth surface that can suitably reflect the radiation into the gas flow path. A thin layer of the high temperature reflector then is applied by a process that can adequately adhere the reflector to the polished TBC surface without increasing the roughness of the surface. The high temperature reflector can be applied to any surface aft of the compressor, but is most beneficially used in the combustor or exhaust portion of the engine, for instance, the combustor wall, the high pressure turbine, the low pressure turbine, and the primary exhaust nozzle portion of the engine. For military aircraft, the high temperature reflector metal would also be beneficially used in the augmentor portion of the engine.

An advantage of the present invention is that the radiation from the combustion process is reflected back into the gas flow path. This radiative heat, rather than being absorbed by a component in the combustor, HPT, LPT, or primary exhaust nozzle portion of the engine, is absorbed by the fluid and carried back into portions of the engine further aft that currently operate at cooler temperatures or out into the atmosphere. The result is that the component does not become as hot. At a given temperature of operation of the engine, the component, because it is operating at a cooler temperature, will not deteriorate as rapidly due to thermal degradation, resulting in longer component life and less mean time between repair or refurbishment. Another advantage of the present invention is that the fluid stream will be heated to a higher temperature as the reflected radiation is absorbed by the materials comprising the gaseous fluid and carried from the combustor portion of the engine into the aft turbine portions of the engine. This increased fluid temperature translates into increased engine efficiency, as the available energy in the fluid stream for both extraction by the turbine to operate the engine and for thrust to propel the aircraft is greater. Still another advantage of the present invention is that the engine can be operated at an even higher temperature than currently experienced using the current invention if shortened component life and increased repair rates can be tolerated in exchange for even greater efficiency.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

In accordance with the present invention, hot section components of a gas turbine engine which form the boundary of the gas flow path or which are located in the gas flow path are coated with a thin layer of a specular optical reflective material that has a high temperature capability. The material as applied has a smooth surface finish so as to speculary reflect the heat back into the fluid path and away from other hot section components.

Figure 1:
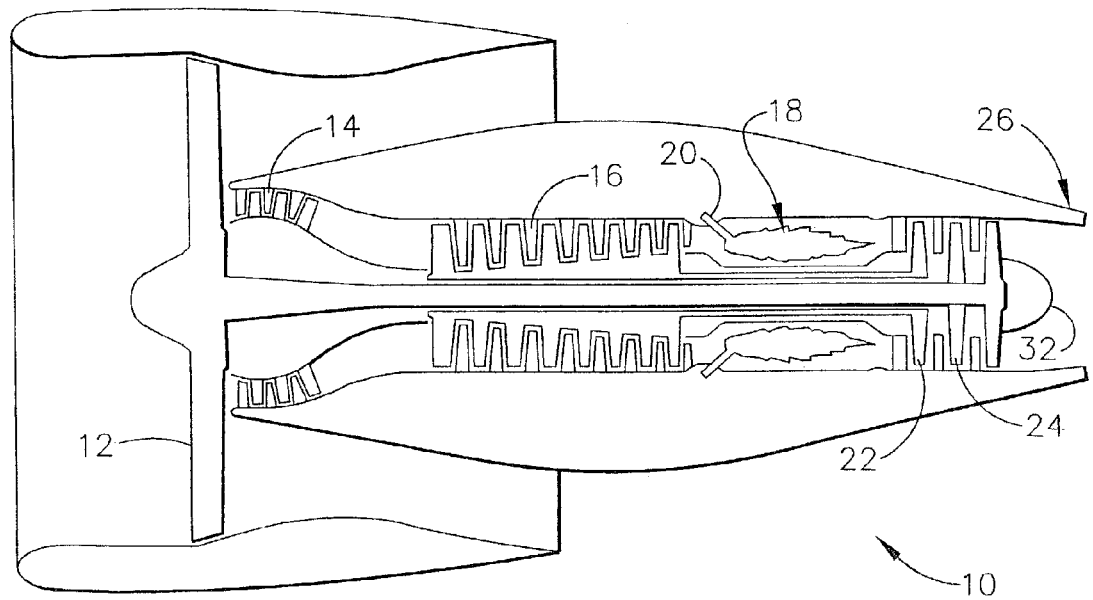
FIG. 1 is a schematic representation of a high bypass turbofan gas turbine engine.

A high bypass aircraft gas turbine engine 10 is shown schematically in FIG. 1. During operation, air is forced through the fan 12. A portion of the air bypasses the core of the engine and is used to contribute to the thrust that propels the engine. A portion of the air is compressed in the booster 14 and compressor 16 portions of the engine up to 10–25 times atmospheric pressure, and adiabatically heated to 800° F.–1250° F. (430° C.–680° C.) in the process. This heated and compressed air is directed into the combustor portion of the engine 18, where it is mixed with fuel supplied through a fuel nozzle system 20. The fuel is ignited, and the combustion process heats the gases to temperatures on the order of 3200° F.–3400° F. (1760° C.–1870° C.). These hot gases pass through the high pressure 22 and low pressure 24 turbines, where rotating discs extract energy to drive the fan and compressor of the engine. Once the hot gases pass through the high pressure turbines, the hot gases are considered to be core gases, rather than combustion gases. The gases then are passed to the exhaust system 26, which includes the centerbody 32, where they contribute to thrust for aircraft propulsion.

Figure 2:
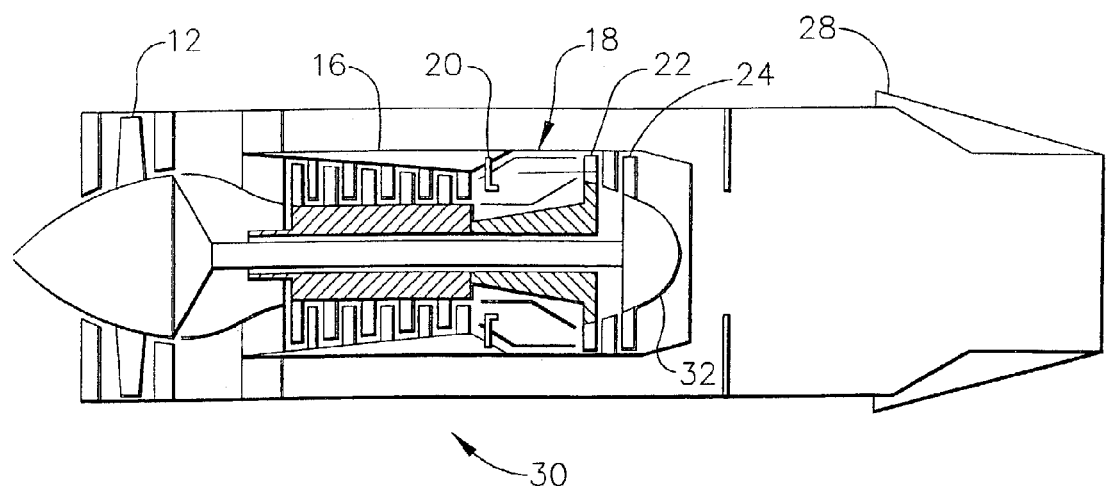
FIG. 2 is a schematic representation of a low bypass turbofan gas turbine engine equipped with an augmentor.

Operation of a low bypass gas turbine engine, shown schematically at 30 in FIG. 2, is similar, except that operational requirements may dictate omission of the booster 14 and addition of an augmentor 28 in the exhaust system shown at 26 in FIG. 1. In a low bypass gas turbine engine, the centerbody 32 is not part of the exhaust system. To emphasize the conceptual similarity, the same identification numerals are employed in both figures.

Additionally, the surface of the centerbody 32 is also coated with thermal barrier coating systems, which are comprised of a bond coat applied between an underlying superalloy base material and an overlying ceramic layer, to create a thermal barrier coating system that reduces the flow of heat to the substrate material. Systems for providing thermal barrier coating systems are well-known in the gas turbine engine art.

Materials employed in the combustor, turbine and exhaust system sections of aircraft gas turbines are typically high temperature superalloys based on nickel, cobalt, iron or combinations thereof. All of these superalloys are believed to be suitable substrate materials for the present invention. Also, monolithic ceramic materials and fiber reinforced ceramic matrix composite materials, described herein collectively as ceramic materials, may be employed in the combustor, turbine and exhaust systems sections of an aircraft gas turbine. Such ceramic materials are specifically contemplated for use in the present invention, and may have slightly higher temperature limits than the high temperature superalloys used for combustors.

Even for gas turbine engines designed for commercial airliners, gas velocity through the engine may approach the speed of sound. Thus, the total gas residence time in the engine is but a small fraction of a second, during which time air coming through the compressor is mixed with liquid fuel, and combustion of the mixture occur. As the mixture is combusted at temperatures above 3000° F. (1650° C.) to form a gas, heat, including radiant heat, is generated. Even with the most recent advances in cooling measures used in gas turbine engines such as active cooling controls and advanced thermal barrier coating systems which reduce the amount and/or rate of heat transferred to components due to convective and conductive heat transfer, the temperatures of the components along the flow path surface are still elevated to very high temperatures. The present invention assists in reducing the amount of heat transferred to these components by radiation transfer.

The present invention utilizes a high temperature specular optical reflector applied directly over existing ceramic materials such as thermal barrier systems utilized to protect the substrate material. These specular optical reflectors are applied as a very thin coating. Conventional and well known techniques for applying thermal barrier coatings provide surfaces that are much too rough for the thin coatings to act as optical reflectors. When these specular reflectors are applied over conventional thermal barrier coatings having surface finishes of 100 micro inches and greater, the rough surface causes the radiation to be scattered in multiple of different directions and are ineffective in transferring heat back into the rapidly moving fluid. When the coatings are porous, such as when used for as a catalytic coating, the radiation is reabsorbed into the substrate, so it cannot be used as an optical reflector.

Figure 3:
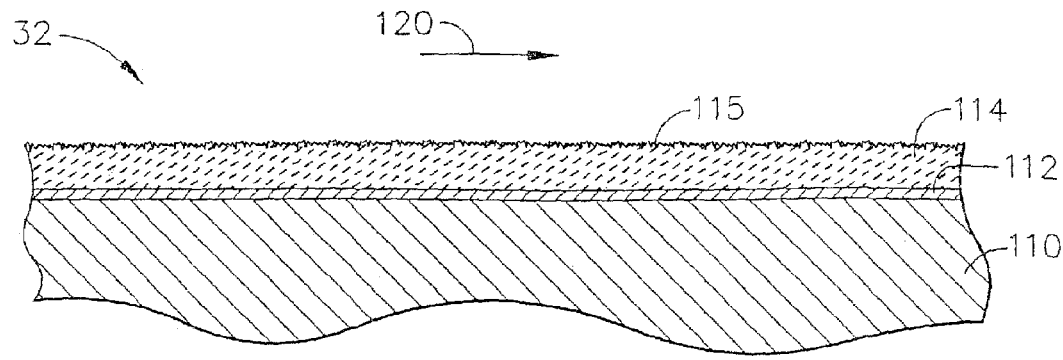
FIG. 3 is a cross-section of an as-manufactured high centerbody of a gas turbine engine after application of a conventional thermal barrier system.

In one embodiment of the present invention, a centerbody is manufactured in accordance with standard manufacturing methods. In addition, there may be surfaces that have heat reflected onto them from reflection or refraction from components near the centerbody that could also benefit from the specular optical coating. Referring to FIG. 3, centerbody 32 is comprised of a substrate 110 suitable for use at high temperatures. As discussed above, the substrate can be selected from several materials. However, as illustrated in FIG. 3, substrate 110 is a high temperature nickel base superalloy. A bond coat 112 is applied over the nickel base superalloy substrate. Overlying bond coat 112 is a ceramic layer 114 having a surface 115 that has a rough surface finish. As used herein, the term "rough surface finish" is one that is greater than about 100 micro inches, since a coarser surface finish would provide an inefficient specular optical reflector. When the substrate is selected from one of the available different materials, such as a ceramic matrix composite material, the bond coat 112 may be omitted.

Figure 4:
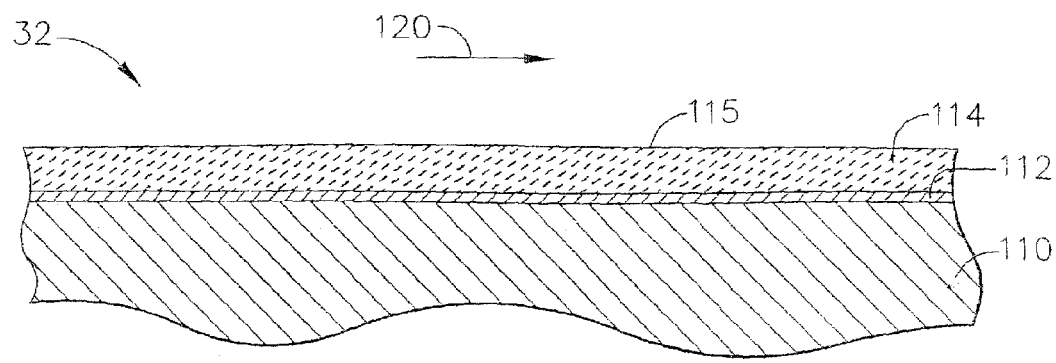
FIG. 4 is a cross-section of the centerbody of the gas turbine engine after the outer surface of the ceramic topcoat has been smoothed to achieve a surface finish of 50 micro inches or finer.

The surface finish of the thermal barrier coating system is typically too rough to act as a specular optical reflector because of the manufacturing techniques used to apply the ceramic top coat. The outer surface of the thermal barrier coating overlying the substrate surface is then polished. In one embodiment, the outer surface of the thermal barrier coating is then polished by hand with fine emery paper so that the surface 115 of ceramic layer 114, as shown in FIG. 4, has a surface finish of no greater than about 50 micro inches, preferably about 32 micro inches and smoother. This smooth surface is required to achieve the reflective properties required for the present invention to be effective. In production, well known polishing techniques such as lapper wheels with diamond paste and tumbling can be employed to speed the polishing process and increase throughput.

Figure 5:
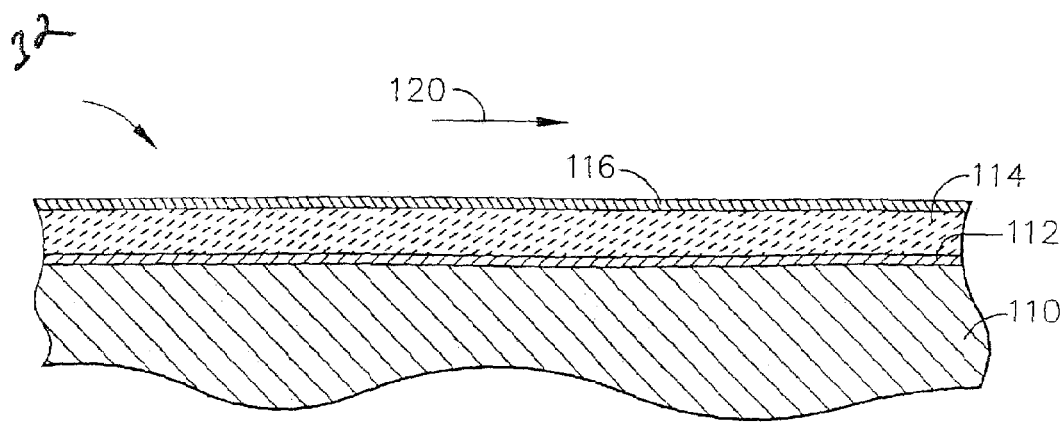
FIG. 5 is schematic representation of the optical reflector of the present invention applied over a smooth ceramic topcoat.

Next, the surface of the thermal barrier coating is coated with a very thin specular reflective coating 116 of a material, as shown in FIG. 5, that will reflect the radiation away from the surface. The coating 116 is applied by a process that deposits material so that a very smooth surface finish is maintained. A preferred method is a chemical vapor deposition (CVD) process that deposits a coating to a thickness of about 1 micron (0.0004"). Other acceptable methods for depositing this thin specular coating to a thickness of about 40 micro inches include sputtering, liquid phase infiltration and physical vapor deposition. However, not all methods for depositing a coating produce coatings consistent with this invention. Other methods such as thermal spray methods do not produce an acceptable coating for specular reflection, as the coatings deposited by these processes are too thick and too rough. The thickness of the specular layer can be greater, for example 400 micro inches or less, but is maintained at about 40 micro inches because of the great expense of the material used as the specular reflector.

A preferred specular reflector coating material is platinum, although palladium or multiple dielectric mirrors comprising tantalum oxide ($Ta_2O_5$), silica ($SiO_2$), titanium dioxide ($TiO_2$), palladium and combinations thereof. It is fundamental that the material used as a coating material remain highly reflective as the hot gas stream 120 passes over the surface. Thus, thick non-adherent oxide scales cannot form, as the formation of these scales destroy the effectiveness of the coating as a reflector. Also, the very thin coating, in addition to being less expensive, is extremely adherent to the polished TBC, and, due to its thinness, does not peel off in layers, which peeling can adversely affect the surface finish. The thin layer does not provide a severe weight penalty for the components to which it is added. In addition, the layer is maintained as a thin layer to allow the surface finish to be of high reflective, optical quality.

Testing of other reflective combustor components has indicated that a specular reflective layer can reflect at least about 80% of the incident radiation, an amount of radiation sufficient to lower the temperature of a component by up to about 100° F. (40° C.) when the temperature of a ceramic coating adjacent to the fluid stream is 2300° F. (1260° C.) as compared to a component having a ceramic coating, but without the specular reflective layer. These components have displayed an improvement of 95° F. (35° C.), as measured by thermocouples attached to deflectors in a high pressure sector test for approximately 100 hours, as compared to a substantially identical deflector that lacked a coating such as described by the present invention. A centerbody is expected to exhibit a similar improvement in performance.

While the present invention has been described as an improvement to a centerbody, the present invention can be applied to any other surface along the gas flow path of a turbine engine or other high temperature devices, such as a continuous furnace or a burner. For example, the specular reflective coating can be applied to the combustor walls, so that any incident radiation is reflected away from the combustor walls and into the gas flow path. Because at least a portion of the energy is reflected from the components comprising the gas flow path, thereby lowering their temperature, the radiation is absorbed by the gases in the gas flow path, thereby raising its temperature.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A component having a specular reflective surface for use in a core hot flow path of a high temperature device in which hot gaseous fluids traverse the device in a core hot flow path, the component comprising:
   a substrate:
   a specular reflective coating having a predetermined thickness overlying the substrate, the specular reflective coating having a surface forming a core hot fluid boundary, the specular reflective material having an applied roughness sufficiently smooth, and having a high temperature capability to survive temperatures in the core hot flow path so that the surface of the specular reflective material reflecis a least about 80% of incident radiation away from its surface to the fluids in the core hot flow path and wherein the coating is not subject to oxidation due to contact with the core hot gaseous fluids; and
   a ceramic material between the substrate material and the specular reflective coating, the ceramic material forming a thermal barrier overlying the substrate material, a surface of the ceramic material opposite the substrate and adjacent the specular reflective coating having a surface roughness about 50 micro inches and smoother.

2. The component of claim 1 wherein the device is a gas turbine engine.

3. The component of claim 2 wherein the component is a centerbody.

4. A centerbody having a specular reflective surface for use in a core hot flow path of a high temperature device in which hot gaseous fluids traverse the device in a core hot flow path, the component comprising:
   a substrate;
   a specular reflective coating having a predetermined thickness overlying the substrate; the specular reflective coating having a surface forming a core hot fluid boundary, the specular reflective matenal having an applied roughness sufficiently smooth, and having a high temperature capability so that the surface of the specular reflective material reflects a least about 80% of incident radiation away from its surface to the gases in the core hot flow path and wherein the coating is not subject to oxidation due to contact with the hot gaseous fluids; and
   a ceramic material between the substrate material and the specular reflective coating, the ceramic material forming a thermal barrier overlying the substrate material, a surface of the ceramic material opposite the substrate and adjacent the specular reflective coating having a surface roughness about 100 micro inches and smoother and the surface of the specular reflective coating having a surface finish of 100 micro inches and smoother.

5. The centerbody of claim 4 wherein the surface of the ceramic material opposite the substrate and adjacent the specular reflective coating has a surface roughness about 50 micro inches and smoother.

6. The centerbody of claim 5 wherein the surface of the ceramic material opposite the substrate and adjacent the specular reflective coating has a surface roughness about 32 micro inches and smoother.

7. The centerbody of claim 6 wherein the specular reflective coating is selected from the group of materials consisting of platinum, palladium, a layer of tantalum oxide ($Ta_2O_5$) a layer of silica ($SiO_2$), a layer of titanium dioxide ($TiO_2$) and combinations thereof.

8. The centerbody of claim 4 wherein the substrate material is a high temperature superalloy selected from the group consisting of Fe, Co, Ni and combinations thereof.

9. A centerbody having a specular reflective surface for use in a core hot flow path of a high temperature device in which hot gaseous fluids traverse the device in a core hot flow path, the component comprising:
   a substrate material wherein the specular reflective surface forms a boundary for core hot gaseous fluids of combustion;
   a specular reflective coating having a predetermined thickness overlying the substrate surface, the specular reflective coating forming the hot fluid boundary, the specular reflective material having an applied roughness sufficiently smooth, and having a high temperature capability so that a surface of the specular reflective material reflects at least about 80% of incident radiation away from its surface to the gases in the core hot flow path and wherein the coating is not subject to oxidation due to contact with the hot gaseous fluids;
   wherein the coating is applied to a predetermined thickness up to about 400 micro inches.

10. A centerbody having a specular reflective surface for use in a core hot flow path of a high temperature device in which hot gaseous fluids traverse the device in a core hot flow path, the component comprising:
    a substrate material wherein the specular reflective surface forms a boundary for core hot gaseous fluids of combustion;
    a specular reflective coating having a predetermined thickness overlying the substrate surface, the specular reflective coating forming the hot fluid boundary, the specular reflective material having an applied roughness sufficiently smooth, and having a high temperature capability so that a surface of the specular reflective material reflects at least about 80% of incident radiation away from its surface to the gases in the core hot flow path and wherein the coating is not subject to oxidation due to contact with the hot gaseous fluids;

wherein the coating is applied to a predetermined thickness about 40 micro inches and less, and forms a continuous coating.

11. A method for manufacturing a centerbody having a specular reflective surface for use in a hot flow path of a gas turbine engine, the method comprising the steps of:

providing a centerbody having a substrate surface;

applying a ceramic thermal barrier coating system over the substrate surface;

mechanically working a surface of a ceramic coating forming the outer layer of the thermal barrier coating system, overlying and opposite the substrate surface to obtain a surface finish of about 100 micro inches and smoother;

applying a specular reflective coating over the surface of the ceramic coating to a predetermined thickness, the method for applying the coating providing a coating surface finish of about 100 micro inches and smoother, an outer surface of the specular reflective coating opposite the ceramic coating being exposed to gaseous fluids in the hot flow path of the engine.

12. The method of claim 11 wherein the step of mechanically working the surface of the ceramic coating further includes obtaining a surface finish of about 50 micro inches and smoother.

13. The method of claim 11 wherein the step of mechanically working the surface of the ceramic coating further includes obtaining a surface finish of about 32 micro inches and smoother.

14. The method of claim 11 wherein the step of applying the specular reflective coating over the surface of the ceramic coating to a predetermined thickness includes applying the coating to a thickness of up to about 10 microns.

* * * * *

UNITED STATES PATENT AND TRADEMARK OFFICE
CERTIFICATE OF CORRECTION

| | |
|---|---|
| PATENT NO. | : 7,181,915 B2 |
| APPLICATION NO. | : 10/335647 |
| DATED | : February 27, 2007 |
| INVENTOR(S) | : Ackermann et al. |

It is certified that error appears in the above-identified patent and that said Letters Patent is hereby corrected as shown below:

Claim 1, Column 7, Line 49, "reflecis" should be --reflects--.
Claim 4, Column 8, Line 5, "matenal" should be --material--.

Signed and Sealed this

Twenty-fourth Day of April, 2007

JON W. DUDAS
*Director of the United States Patent and Trademark Office*